(12) United States Patent
Cho et al.

(10) Patent No.: US 10,113,640 B2
(45) Date of Patent: Oct. 30, 2018

(54) SHIFTING CONTROL METHOD FOR HYBRID VEHICLES

(71) Applicant: HYUNDAI MOTOR COMPANY, Seoul (KR)

(72) Inventors: Sung Hyun Cho, Yongin-si (KR); Ju Hyun Nam, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 45 days.

(21) Appl. No.: 15/332,725

(22) Filed: Oct. 24, 2016

(65) Prior Publication Data

US 2017/0356546 A1 Dec. 14, 2017

(30) Foreign Application Priority Data

Jun. 13, 2016 (KR) .......................... 10-2016-0073128

(51) Int. Cl.
*F16H 61/688* (2006.01)
*B60W 20/00* (2016.01)

(52) U.S. Cl.
CPC ........... *F16H 61/688* (2013.01); *B60W 20/00* (2013.01); *Y10S 903/945* (2013.01); *Y10S 903/946* (2013.01)

(58) Field of Classification Search
CPC .. F16H 61/688; B60W 20/00; Y10S 903/946; Y10S 903/945
See application file for complete search history.

(56) References Cited

U.S. PATENT DOCUMENTS

| 8,066,616 B2 | 11/2011 | Minamikawa |
| 8,308,609 B2 | 11/2012 | Holland et al. |
| 2011/0021311 A1* | 1/2011 | Kim ...................... B60W 10/08 477/3 |

FOREIGN PATENT DOCUMENTS

| JP | 4207837 B2 | 1/2009 |
| JP | 4238927 B1 | 3/2009 |
| JP | 2012046003 A | 3/2012 |
| JP | 5374914 B2 | 12/2013 |
| JP | 5678575 B2 | 3/2015 |
| JP | 2015-116832 A | 6/2015 |
| JP | 2015-229441 A | 12/2015 |
| KR | 10-2014-0005545 A | 1/2014 |

* cited by examiner

Primary Examiner — Brian P Sweeney
(74) Attorney, Agent, or Firm — Brinks Gilson & Lione

(57) ABSTRACT

The present disclosure provides a shifting control method for hybrid vehicles to reduce the occurrence of a clutch releasing phenomenon due to an excessive change in input torque of a transmission during shifting of the vehicle, including: an entering step of performing, by a controller, a control to enter a torque hand over control in response to power off down shifting; and a rising control step of controlling, by the controller, an engagement side clutch torque to rise to correspond to a changed input torque of a transmission when a change rate in input torque of the transmission is equal to or more than a reference value during the torque hand over process.

5 Claims, 3 Drawing Sheets

SHIFTING CONTROL METHOD FOR HYBRID VEHICLES

CROSS REFERENCE TO RELATED APPLICATION

The present application claims the benefit of and priority to Korean Patent Application No. 10-2016-0073128, filed on Jun. 13, 2016, the entire contents of which is incorporated herein by reference.

FIELD

The present disclosure relates to a shifting control method for hybrid vehicles.

BACKGROUND

The statements in this section merely provide background information related to the present disclosure and may not constitute prior art.

In the case of hybrid vehicles, regenerative braking is typically performed using a motor directly connected to wheels to control a braking force of the motor to be continuously transferred to the wheels, thereby improving fuel efficiency.

That is, when a driver steps on a brake while driving a vehicle, electricity is generated by the regenerative braking of the motor to charge a battery. Therefore, the charged power of the battery is used as a power source that may output power when the vehicle restarts. Therefore, the regenerative braking of the motor plays an important role in fuel efficiency, which is identically applied even in a shifting section of the transmission.

However, we have discovered that when the clutch of the transmission is initially released during the regenerative braking, the braking forces of a vehicle are lost despite the divers pushing of the brake, and therefore the vehicle is in a risky diving mode with reduced diving stability of the vehicle.

For example, we have found that when the regenerative braking torque is suddenly changed during power off down shifting, and thus the change in input torque of the transmission is excessive, an engagement side clutch torque is not sufficient, and therefore a summed torque of the engagement side clutch and a release side clutch becomes lower than the input torque of the transmission, such that the releasing of the clutch may occur.

The contents described as the related art have been provided only to assist in the understanding of the background of the present disclosure and should not be considered as corresponding to the related art known to those skilled in the art.

Further areas of applicability will become apparent from the description provided herein. It should be understood that the description and specific examples are intended for purposes of illustration only and are not intended to limit the scope of the present disclosure.

SUMMARY

The present disclosure provides a shifting control method for hybrid vehicles capable of preventing or reducing a clutch releasing phenomenon from occurring due to an excessive change in input torque of a transmission during the shifting of the vehicle.

According to one form of the present disclosure, a shifting control method for hybrid vehicles, includes: performing an entering step, by a controller, wherein a torque hand over control is entered in response to a power off down shifting; and performing a rising control step, by the controller, wherein an engagement side clutch torque is increased to correspond to a changed input torque of a transmission when a change rate in an input torque of the transmission is equal to or greater than a reference value during the torque hand over control.

The rising control step may include a first calculating step wherein a first target engagement side clutch torque is calculated from a control start time when the change rate of the input torque of the transmission rises to be equal to or greater than the reference value to a control end time when the torque hand over control ends, and the first target engagement side clutch torque is calculated by incrementing a clutch torque calculated by reflecting the input torque of the transmission up to the control end time from a target hold engagement side clutch torque calculated by reflecting the input torque of the transmission based on the control start time. The rising control step may further indude a second calculating step wherein a second target engagement side clutch torque is calculated from the control start time when the change rate of the input torque of the transmission rises to be equal to or greater than the reference value to the control end time when the torque hand over control ends, and incrementing and calculating the second target engagement side clutch torque until an engagement side clutch torque based on the control start time reaches the target hold engagement side clutch torque. Finally, the rising control step may further include a third calculating step wherein a third target engagement side clutch torque is calculated by summing the first target engagement side clutch torque calculated in the first calculating step and the second target engagement side clutch torque calculated in the second calculating step.

In the first calculating step, the first target engagement side clutch torque may be calculated by the following Equation 1.

$$\text{The first target engagement side clutch torque} =$$
$$(\text{Apply Clutch Target}(**) - \text{Apply Clutch Target Hold}) =$$
$$\{(|\text{input torque of transmission}| +$$
$$\text{factor}^*(Je(0 \text{ other than when engine clutch is attached}) + Jm)^*$$
$$dNm/dt)\} - \text{Apply Clutch Target Hold}) \quad \text{Equation 1}$$

In the above Equation 1, Apply Clutch Target(**) is a target engagement side clutch torque calculated by reflecting a current input torque of the transmission;

Apply Clutch Target Hold is a fixed value target hold engagement side clutch torque calculated by reflecting the input torque of transmission at the control start time;

Je is an engine rotation inertia;

Jm is a motor rotation inertia;

dNm/dt is a motor angular acceleration; and factor is a constant.

In the second calculating step, the second target engagement side clutch torque may be calculated by the following Equation 2.

The second target engagement side clutch torque =     Equation 2

Apply Clutch Torque(t−1)value Hold +

New Auto Ramp to Target(***) =

Apply Clutch Torque(t−1)value Hold +

{(Apply Clutch Target Hold −

Apply Clutch Torque(t−1)value Hold) −

New Auto Ramp to Target(t−1)/(Torque

Phase Target Time − Phase duration time)

In the above Equation 2, Apply Clutch Torque(t−1) value Hold is a fixed value hold engagement side clutch torque before the control start time;

New Auto Ramp to Target is an engagement side clutch torque until the engagement side clutch torque based on the control start time reaches the target hold engagement side clutch torque;

New Auto Ramp to Target(t−1) is an engagement side clutch torque increment value per one cycle until the engagement side clutch torque before the control start time reaches the target hold engagement side clutch torque;

Torque Phase Target Time is a torque hand over control target time; and

Phase duration time is a torque hand over control elapsed time.

The shifting control method for hybrid vehicles may further include performing a control end determining step after the rising control step, wherein it is determined whether a torque hand over elapse time reaches a torque hand over target time.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
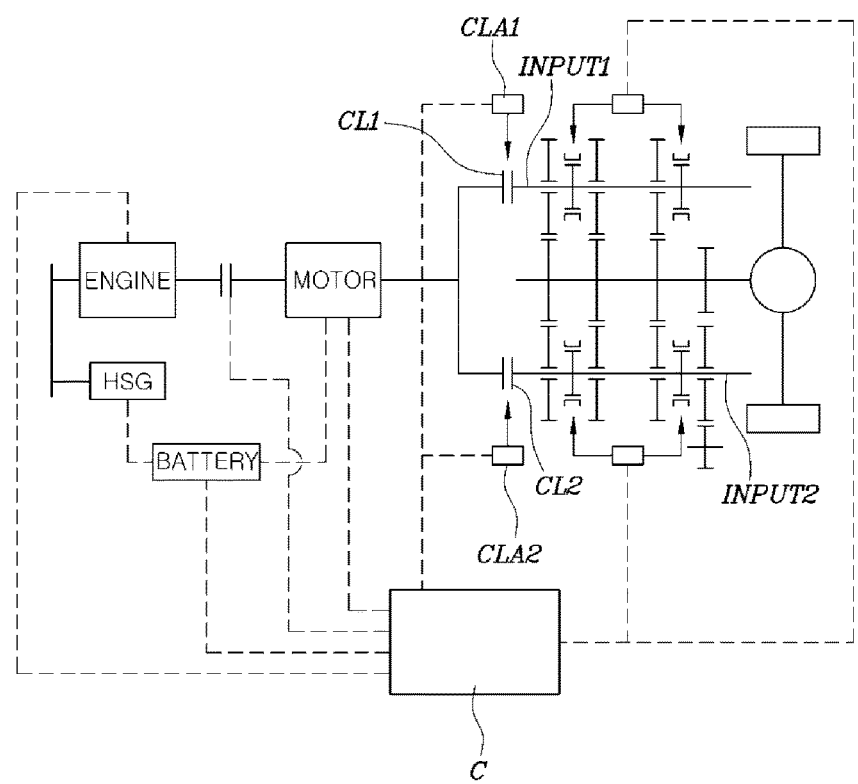
FIG. 1 is a diagram schematically illustrating an overall configuration of a hybrid Dual-Clutch Transmission (DCT) vehicle to which one form of the present disclosure may be applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Various forms of the present disclosure will be described in detail with reference to the accompanying drawings.

One form of the present disclosure may be applied to a hybrid vehicle in which a Dual-Clutch Transmission (DCT) is equipped as illustrated in FIG. 1. Referring to FIG. 1, a DCT includes two clutches, i.e., an engagement side clutch and a release side clutch each represented by reference numerals CL1 and CL2, an engagement side clutch actuator and a release side clutch actuator operating the CL1 and CL2 are each represented by reference numerals CLA1 and CLA2, and an engagement side input shaft and a release side output shaft are each represented by reference numerals INPUT1 and INPUT2.

However, this is only for convenience of understanding of the present disclosure. Therefore, the engagement side and the release side may be interchanged depending on what a clutch for forming a current shift stage and a clutch for forming a target shift stage are.

Meanwhile, the shifting control method for hybrid vehicles according to one form of the present disclosure may include an entering step (S10) and a rising control step (S20).

Figure 2:
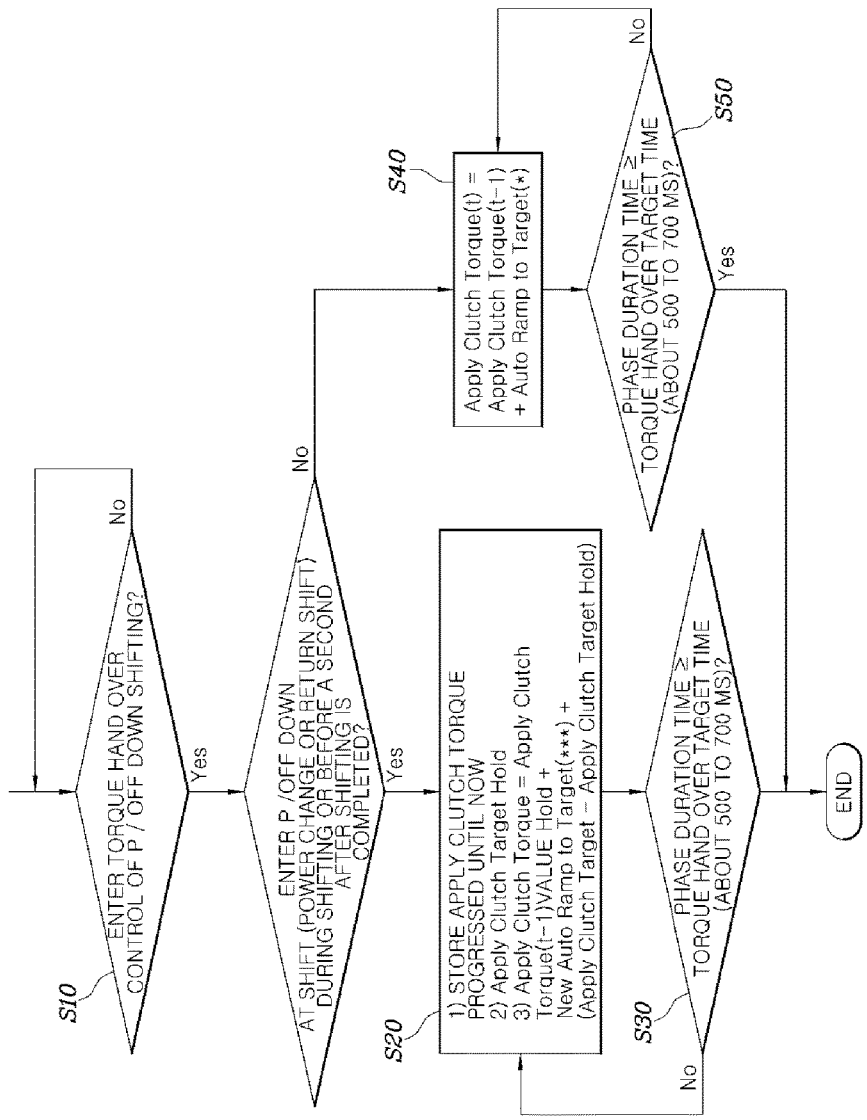
FIG. 2 is a flowchart of a shifting control method according to one form of the present disclosure.
Figure 3:
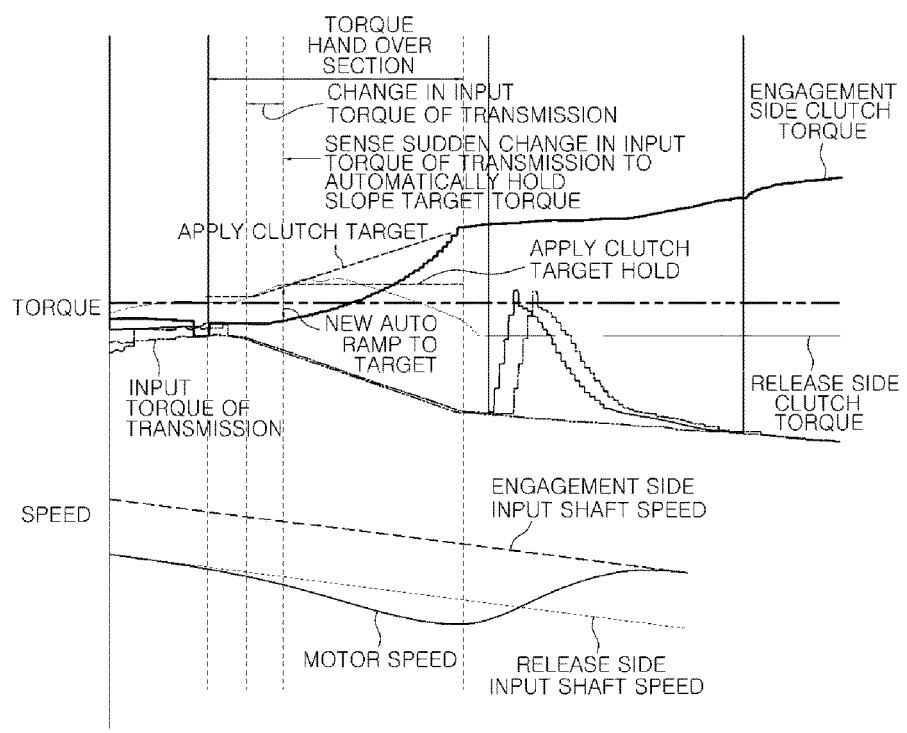
FIG. 3 is a diagram showing an operation condition according to the shifting control method according to one form of the present disclosure.

Describing the present disclosure with reference to FIGS. 2 and 3 in detail, first, in the entering step (S10), a controller C may perform a control to enter a torque hand over control in response to power off down shifting.

That is, when a shift to a lower stage is made in a state in which a driver is not depressing an accelerator pedal, a torque phase is started up to perform a control to enter the torque hand over control that releases the release side clutch CL2 while engaging the engagement side clutch CL1.

In the rising control step (S20), when a change rate of input torque of the transmission is equal to or greater than a reference value during the torque hand over process, an engagement side clutch torque may be controlled to rise or increase to correspond to an input torque of a transmission changed by the controller C.

For example, when another shift is performed during the shifting or another power off down shift is performed before a predetermined time elapses after the shifting according to a manipulation of a brake pedal is completed, the change rate of input torque of the transmission may be equal to or greater than the reference value. In this case, the input torque of the transmission may be suddenly reduced.

That is, when the regenerative braking torque is suddenly changed within the torque hand over section during the power off down shift and thus the change in input torque of the transmission is excessive, the change in input torque of the transmission is sensed to control the engagement side clutch torque to increase to correspond to the sensed change, thereby preventing or reducing the clutch from being released due to the lack of the engagement side clutch torque.

Therefore, the shortage of the braking force is prevented by limiting a loss of the regenerative braking torque transferred to the wheels, thereby improving braking lineally of a vehicle and increasing diving stability of the vehicle.

Further, in the case of the present disclosure, the rising control step (S20) may include a first calculating step, a second calculating step, and a third calculation step.

First, in the first calculating step, a first target engagement side clutch torque may be calculated from a control start time when the change rate of input torque of the transmission increases to be equal to or greater than the reference value to a control end time when the torque hand over control ends.

For example, the first target engagement side clutch torque may be calculated by incrementing the clutch torque calculated by reflecting the input torque of the transmission up to the control end time from a target hold engagement side clutch torque calculated by reflecting the input torque of the transmission based on the control start time.

In detail, the first target engagement side clutch torque may be calculated by the following Equation 1.

$$\begin{aligned}\text{The first target engagement side clutch torque} = \\ (\text{Apply Clutch Target}(**) - \text{Apply Clutch Target Hold}) = \\ \{(|\text{input torque of transmission}| + \\ \text{factor}^*(Je(0 \text{ other than when engine clutch is attached}) + Jm)^* \\ dNm/dt)\} - \text{Apply Clutch Target Hold})\end{aligned} \quad \text{Equation 1}$$

In the above Equation 1, Apply Clutch Target(**) is the target engagement side clutch torque calculated by reflecting the current input torque of transmission; Apply Clutch Target Hold is target hold engagement side clutch torque (fixed value) calculated by reflecting the input torque of the transmission at the control start time;

Je is Engine rotation inertia;
Jm is Motor rotation inertia;
dNm/dt is Motor angular acceleration; and
factor is a Constant.

That is, based on the target hold engagement side clutch torque at the early stage of the control calculated by reflecting the input torque of the transmission at the control start time, the target engagement side clutch torque calculated by reflecting an absolute value of the input torque of the transmission is continuously incremented, and as a result a first target engagement side clutch torque having a predetermined slope may be calculated.

Next, in the second calculating step, a second target engagement side clutch torque may be calculated from a control start time when the change rate of input torque of the transmission increases to be equal to or greater than the reference value to a control end time when the torque hand over control ends.

For example, the second target engagement side clutch torque may be calculated by being incremented from the control start time until the engagement side clutch torque reaches the target hold engagement side clutch torque.

In detail, the second target engagement side clutch torque may be calculated by the following Equation 2.

$$\begin{aligned}\text{The second target engagement side clutch torque} = \\ \text{Apply Clutch Torque}(t-1)\text{value Hold} + \\ \text{New Auto Ramp to Target}(***) = \\ \text{Apply Clutch Torque}(t-1)\text{value Hold} + \\ \{(\text{Apply Clutch Target Hold} - \\ \text{Apply Clutch Torque}(t-1)\text{value Hold}) - \\ \text{New Auto Ramp to Target}(t-1)/(\text{Torque} \\ \text{Phase Target Time} - \text{Phase duration time})\end{aligned} \quad \text{Equation 2}$$

In the above Equation 2, Apply Clutch Torque(t−1) value Hold is the hold engagement side clutch torque (fixed value) before control start time;

New Auto Ramp to Target(***): is the engagement side clutch torque until the engagement side clutch torque based on control start time reaches the target hold engagement side clutch torque;

New Auto Ramp to Target(t−1) is the engagement side clutch torque increment value per one cycle until the engagement side clutch torque before the control start time reaches the target hold engagement side clutch torque;

Torque Phase Target Time is the torque hand over control target time; and

Phase duration time is the torque hand over control elapse time.

That is, based on the engagement side clutch torque at the control start time, the clutch torque is continuously incremented until reaching the target hold engagement side clutch torque at the control end time, and as a result the second target engagement side clutch torque having a predetermined slope may be calculated.

In the third calculating step, the values calculated in the first calculating step and the second calculating step may be summed to calculate a final target engagement side clutch torque.

That is, the first target engagement side clutch torque and the second target engagement side clutch torque may be summed to calculate the final target engagement side clutch torque, and the engagement side clutch torque may be controlled depending on a profile of the calculated final target engagement side clutch torque to prevent the phenomenon in which the clutch is released due to the shortage of the engagement side clutch torque.

Further, the present disclosure may further include a control ending determining step (S30) of determining whether the torque hand over elapse time reaches a torque hand over target time after the rising control step (S20).

That is, when the elapsed time when the torque hand over control is performed reaches the torque hand over target time, the logic ends and an inertia phase is started up to perform the rest shifting process.

As described above, the present disclosure controls the engagement side clutch torque to increase in response to the change in input torque of the transmission when the change in input torque of the transmission is excessive during the power off down shifting. Therefore, the clutch releasing phenomenon occurring due to the shortage of the engagement side clutch torque is prevented, and therefore the shortage phenomenon of the braking force is prevented or reduced, thereby improving the braking linearity of the vehicle and improving the driving stability of the vehicle.

Meanwhile, according to the present disclosure, when the change rate in the input torque of the transmission is less than the reference value during the torque hand over process, the controller C may control the engagement side clutch torque to correspond to the input torque of the transmission (S40).

Further, after the step S40, it may be determined whether the torque hand over elapsed time reaches the torque hand over target time (S50).

For example, the calculation is performed from the control start time when the torque hand over control starts to the control end time when the torque hand over control ends and the clutch torque calculated by reflecting the input torque of the transmission up to the control end time from the target engagement side clutch torque calculated by reflecting the input torque of the transmission based on the control start time may be incremented to calculate the target engagement side clutch torque.

In detail, the target engagement side clutch torque may be calculated by the following Equation 3.

$$\text{Target engagement side clutch torque(Apply Clutch Torque}(t)) = \text{Apply Clutch Torque}(t-1) + \text{Auto Ramp to Target}(*) = \text{Apply Clutch Torque}(t-1) + \{(\text{Apply Clutch Target}(**) - \text{Apply Clutch Torque}(t-1))/(\text{Torque Phase Target Time-Phase duration time})\} \quad \text{Equation 3}$$

In the above Equation 3, (Apply Clutch Target(**)={(|input torque of transmission|+factor*(Je(0 other than when engine clutch is attached)+Jm)*dNm/dt)}−Apply Clutch Target Hold);

Apply Clutch Torque(t−1) is the engagement side clutch torque before torque hand over control start time; and Auto Ramp to Target(*) is the engagement side clutch torque from the torque hand over control start time until the engagement side clutch torque reaches the torque hand over control end time;

That is, based on the engagement side clutch torque at the torque hand over control start time, the clutch torque is continuously incremented up to the torque hand over control end time to calculate the target engagement side clutch torque having a predetermined slope.

According to the various forms of the present disclosure, when the change in input torque of the transmission is excessive during the power off down shifting, the engagement side clutch torque is controlled to increase in response to the change in input torque of the transmission to thereby prevent or reduce the clutch releasing phenomenon from occurring due to the shortage of the engagement side clutch torque and prevent the braking force shortage phenomenon, thereby improving the braking linearity of the vehicle and improving the diving stability of the vehicle.

Meanwhile, although specific examples of the present disclosure have been described above in detail, it is obvious to those skilled in the art that various modifications and alterations may be made without departing from the spirit and scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A shifting control method for hybrid vehicles, the method comprising:
   performing an entering step, by a controller, wherein a torque hand over control is entered in response to a power off down shifting; and
   performing a rising control step, by the controller, wherein an engagement side clutch torque is increased to correspond to a changed input torque of a transmission when a change rate in an input torque of the transmission is equal to or greater than a reference value during the torque hand over control.

2. The shifting control method for hybrid vehicles of claim 1, wherein the rising control step includes:
   a first calculating step wherein a first target engagement side clutch torque is calculated from a control start time when the change rate of the input torque of the transmission rises to be equal to or greater than the reference value to a control end time when the torque hand over control ends, and the first target engagement side clutch torque is calculated by incrementing a clutch torque calculated by reflecting the input torque of the transmission up to the control end time from a target hold engagement side clutch torque calculated by reflecting the input torque of the transmission based on the control start time;
   a second calculating step wherein a second target engagement side clutch torque is calculated from the control start time when the change rate of the input torque of the transmission rises to be equal to or greater than the reference value to the control end time when the torque hand over control ends, and incrementing and calculating the second target engagement side clutch torque until an engagement side clutch torque based on the control start time reaches the target hold engagement side clutch torque; and
   a third calculating step wherein a third target engagement side clutch torque is calculated by summing the first target engagement side clutch torque calculated in the first calculating step and the second target engagement side clutch torque calculated in the second calculating step.

3. The shifting control method for hybrid vehicles of claim 2, wherein in the first calculating step, the first target engagement side clutch torque is calculated by the following Equation:

$$\text{the first target engagement side clutch torque} = (\text{Apply Clutch Target}(**) - \text{Apply Clutch Target Hold}) = \{(|\text{Input torque of transmission}| + \text{factor}^*(Je(0 \text{ other than when engine clutch is attached}) + Jm)^* \, dNm/dt)\} - \text{Apply Clutch Target Hold};$$

wherein Apply Clutch Target(**) is a target engagement side clutch torque calculated by reflecting a current input torque of the transmission;

Apply Clutch Target Hold is a fixed value target hold engagement side clutch torque calculated by reflecting the input torque of transmission at the control start time;

Je is an engine rotation inertia;

Jm is a motor rotation inertia;

dNm/dt is a motor angular acceleration; and factor is a constant.

4. The shifting control method for hybrid vehicles of claim 3, wherein in the second calculating step, the second target engagement side clutch torque is calculated by the following Equation:

$$\text{the second target engagement side clutch torque} = \text{Apply Clutch Torque}(t-1)\text{value Hold} +$$

-continued
$$\begin{aligned}&\text{New Auto Ramp to Target}(***) = \\ &\text{Apply Clutch Torque}(t-1)\text{value Hold} + \\ &\{(\text{Apply Clutch Target Hold} - \text{Apply Clutch Torque}(t-1)\text{value Hold}) - \\ &\text{New Auto Ramp to Target}(t-1)\}/(\text{Torque Phase Target Time} - \text{Phase duration time});\end{aligned}$$

wherein Apply Clutch Torque(t−1) value Hold is a fixed value hold engagement side clutch torque before the control start time;

New Auto Ramp to Target(***) is an engagement side clutch torque until the engagement side clutch torque based on the control start time reaches the target hold engagement side clutch torque;

New Auto Ramp to Target(t−1) is an engagement side clutch torque increment value per one cycle until the engagement side clutch torque before the control start time reaches the target hold engagement side clutch torque;

Torque Phase Target Time is a torque hand over control target time; and

Phase duration time is a torque hand over control elapsed time.

5. The shifting control method for hybrid vehicles of claim 2, further comprising:

performing a control end determining step after the rising control step, wherein it is determined whether a torque hand over elapsed time reaches a torque hand over target time.

\* \* \* \* \*